(12) United States Patent
Herman et al.

(10) Patent No.: US 12,333,751 B2
(45) Date of Patent: Jun. 17, 2025

(54) OBJECT DETECTION

(71) Applicant: Ford Global Technologies, LLC, Dearborn, MI (US)

(72) Inventors: David Michael Herman, West Bloomfield, MI (US); Akshay Vaidya, Canton, MI (US); Larry Sanders, Monroe, MI (US); Binduhasini Sairamesh, Milpitas, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 408 days.

(21) Appl. No.: 18/053,422

(22) Filed: Nov. 8, 2022

(65) Prior Publication Data

US 2023/0230267 A1     Jul. 20, 2023

Related U.S. Application Data

(63) Continuation-in-part of application No. 17/578,622, filed on Jan. 19, 2022, now Pat. No. 12,148,222.

(51) Int. Cl.
    *G06T 7/564*     (2017.01)
    *G01B 11/25*     (2006.01)

(52) U.S. Cl.
    CPC .......... *G06T 7/564* (2017.01); *G01B 11/2531* (2013.01); *G01B 11/254* (2013.01)

(58) Field of Classification Search
    CPC ..... G01B 11/24; G01B 11/25; G01B 11/2513; G01B 11/2433; G01B 11/00; G01B 11/22; G01B 11/2518; G01B 11/2545; G01B 11/245; G01B 11/26; G01B 11/303; G01B 5/008; G01B 11/2509; G01B 21/28;

(Continued)

(56) References Cited

U.S. PATENT DOCUMENTS 7,656,508 B2    2/2010   Iwaki et al.
8,417,021 B2    4/2013   Cipolla et al.
(Continued)

FOREIGN PATENT DOCUMENTS

WO    WO-2017035498 A1 *   3/2017  ............. G06T 7/586
WO    WO-2019066724 A1 *   4/2019  ............. G01B 11/25

OTHER PUBLICATIONS

Wang, J. et a;, "Photometric Stereo with Small Angular Variations," International Conference on Computer Vision (ICCV), 2015, 9 pages.

(Continued)

*Primary Examiner* — Michael P Stafira
(74) *Attorney, Agent, or Firm* — Frank Lollo; Brooks Kushman P.C.

(57) ABSTRACT

A computer that includes a processor and a memory, the memory including instructions executable by the processor can activate a plurality of light sources in an alternating pattern at an illumination frequency and acquire image data depicting light reflected from an object at a timing corresponding to the alternating pattern at the illumination frequency. In response to variations in the light impinging upon the object from the alternating pattern, an object contour can be determined based on estimating one or more object surface normals based on photometric stereo. One or more of object identity and object depth can be determined based on combining the object contour with the image data.

20 Claims, 7 Drawing Sheets

(58) Field of Classification Search
CPC . G01B 11/005; G01B 11/0641; G01B 11/254; G01B 11/30; G01B 21/047; G01B 2210/58; G01B 5/012; G01B 11/002; G01B 11/022; G01B 11/026; G01B 11/14; G01B 11/16; G01B 21/042; G01B 5/28; G01B 11/007; G01B 11/0608; G01B 11/2531; G01B 2210/54; G01B 9/08; G06T 2207/10028; G06T 7/586; G06T 2207/10024; G06T 7/11; G06T 2207/20081; G06T 2207/20084; G06T 2207/10152; G06T 19/006; G06T 2207/10016; G06T 17/20; G06T 7/0004; G06T 5/50; G06T 7/593; G06T 7/55; G06T 7/73; G06T 7/70; G06T 17/00; G06T 7/521; G06T 2207/30201; G06T 2207/30268; G06T 2207/30196; G06T 2207/30252; G06T 7/50; G06T 19/20; G06T 15/04; G06T 2207/10012; G06T 2207/30244; G06T 2219/024; G06T 7/174; G06T 2207/20056; G06T 2207/20221; G06T 5/20; G06T 5/70; G06T 15/20; G06T 5/90; G06T 7/60; G06T 2207/30108; G06T 2207/30184; G06T 7/90; G06T 15/02; G06T 19/003; G06T 2200/24; G06T 2207/10021; G06T 2207/10032; G06T 7/20; G06T 7/42; G06T 15/205; G06T 2207/10004; G06T 2207/20021; G06T 7/514; G06T 17/05; G06T 2200/04; G06T 2207/20076; G06T 2219/2004; G06T 7/00; G06T 7/12; G06T 7/30; G06T 2207/20028; G06T 2207/20192; G06T 2219/024; G06T 7/246; G06T 7/75; G06T 11/00; G06T 11/60; G06T 15/506; G06T 2200/08; G06T 2207/30164; G06T 5/94; G06T 2207/10068; G06T 2207/30008; G06T 7/13; G06T 7/579; G06T 15/00; G06T 15/50; G06T 2207/20228; G06T 2207/30208; G06T 2207/30264; G06T 3/20; G06T 3/60; G06T 7/136; G06T 7/40; G06T 7/62; G06T 2207/20004; G06T 2207/20036; G06T 2207/30156; G06T 2207/30204; G06T 5/73; G06T 7/0008; G06T 7/254; G06T 7/33; G06T 11/001; G06T 15/10; G06T 2207/10048; G06T 2207/20024; G06T 2207/30112; G06T 2219/2021; G06T 5/60; G06T 5/75; G06T 7/194; G06T 7/557; G06T 7/74; G06T 7/80; G06T 9/002; G06T 1/0014; G06T 15/08; G06T 17/10; G06T 17/205; G06T 2207/20104; G06T 2207/20132; G06T 2207/30132; G06T 3/40; G06T 3/4015; G06T 5/92; G06T 7/001; G06T 7/187; G06T 7/269; G06T 7/337; G06T 7/49; G06T 7/507; G06T 7/536; G06T 17/30; G06T 2207/10141; G06T 2207/20012; G06T 2207/20212; G06T 2207/20224; G06T 2207/30192; G06T 2207/30232; G06T 2207/30241; G06T 3/14; G06T 7/0012; G06T 7/41; G06T 7/64; G06T 13/40; G06T 15/005; G06T 15/06; G06T 19/00; G06T 2200/32; G06T 2207/10052; G06T 2207/30121; G06T 2207/30136; G06T 2207/30161; G06T 2210/04; G06T 2210/21; G06T 2210/56; G06T 2215/16; G06T 2219/004; G06T 3/067; G06T 3/4038; G06T 5/00; G06T 5/40; G06T 7/0006; G06T 7/32; G06T 7/543; G06T 7/564; G06T 7/85; G06T 9/001; G06T 1/20; G06T 15/55; G06T 15/83; G06T 17/005; G06T 2207/10056; G06T 2207/20072; G06T 2207/20112; G06T 2207/20172; G06T 2207/20208; G06T 2207/30028; G06T 2207/30212; G06T 2207/30248; G06T 2207/30261; G06T 2210/16; G06T 2210/36; G06T 2210/62; G06T 2211/416; G06T 3/02; G06T 3/147; G06T 7/10; G06T 7/251; G06T 7/262; G06T 7/292; G06T 7/344; G06T 7/529; G06T 7/596; G06T 7/97

See application file for complete search history.

(56) References Cited

U.S. PATENT DOCUMENTS

| | | | |
|---|---|---|---|
| 8,970,693 B1* | 3/2015 | Chang | G06T 19/006 348/136 |
| 9,102,271 B2 | 8/2015 | Trombley et al. | |
| 9,137,511 B1* | 9/2015 | LeGrand, III | G06T 7/586 |
| 9,819,925 B2 | 11/2017 | Posselius et al. | |
| 9,992,474 B2 | 6/2018 | Grunnet-Jepsen et al. | |
| 10,266,023 B2 | 4/2019 | Mattern et al. | |
| 10,384,609 B2 | 8/2019 | Zhang et al. | |
| 10,417,816 B2 | 9/2019 | Satzoda et al. | |
| 11,100,347 B2 | 8/2021 | Herman | |
| 11,176,647 B2* | 11/2021 | Auner | G06T 5/92 |
| 12,069,227 B2* | 8/2024 | Venkataraman | G02B 30/25 |
| 2014/0184749 A1* | 7/2014 | Hilliges | G06T 19/006 348/47 |
| 2015/0193973 A1* | 7/2015 | Langguth | G06T 7/586 345/420 |
| 2019/0349571 A1 | 11/2019 | Herman et al. | |
| 2022/0051471 A1 | 2/2022 | Logothetis et al. | |
| 2023/0097584 A1* | 3/2023 | Chakravarty | G06N 3/08 382/276 |
| 2023/0204781 A1* | 6/2023 | Thakur | G01S 17/894 356/5.01 |
| 2023/0230387 A1* | 7/2023 | Herman | G06V 20/56 701/25 |

OTHER PUBLICATIONS

Brahimi, M., et al. "On the well-posedness of uncalibrated photometric stereo under general lighting," arXiv:1911.07268v2 [cs.CV] Sep. 17, 2020, 29 pages.

Chen, G, et al., "Self-calibrating Deep Photometric Stereo Networks," arXiv:1903.07366v1 [cs.CV] Mar. 18, 2019, 9 pages.

Shi, B. et al., "Self-calibrating Photometric Stereo," Conference on Computer Vision and Pattern Recognition (CVPR), 2010, 8 pages.

Vlasic, D, et al., "Dynamic Shape Capture using Multi-View Photometric Stereo," ACM Trans. Graphics (Proc. SIGGRAPH Asia), Dec. 2009, 11 pages.

Logothetis, F. et al., "Near-Field Photometric Stereo in Ambient Light," ResearchGate, Jan. 2016, 12 pages.

* cited by examiner

OBJECT DETECTION

RELATED APPLICATION

This application is a continuation-in-part of, and as such claims priority to, prior application Ser. No. 17/578,622 filed Jan. 19, 2022, and incorporated herein by reference in its entirety.

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more image sensors that can be processed to determine data regarding objects. Data extracted from images of objects can be used by a computer to operate systems including vehicles, robots, security systems, and/or object tracking systems.

DETAILED DESCRIPTION

Figure 1:
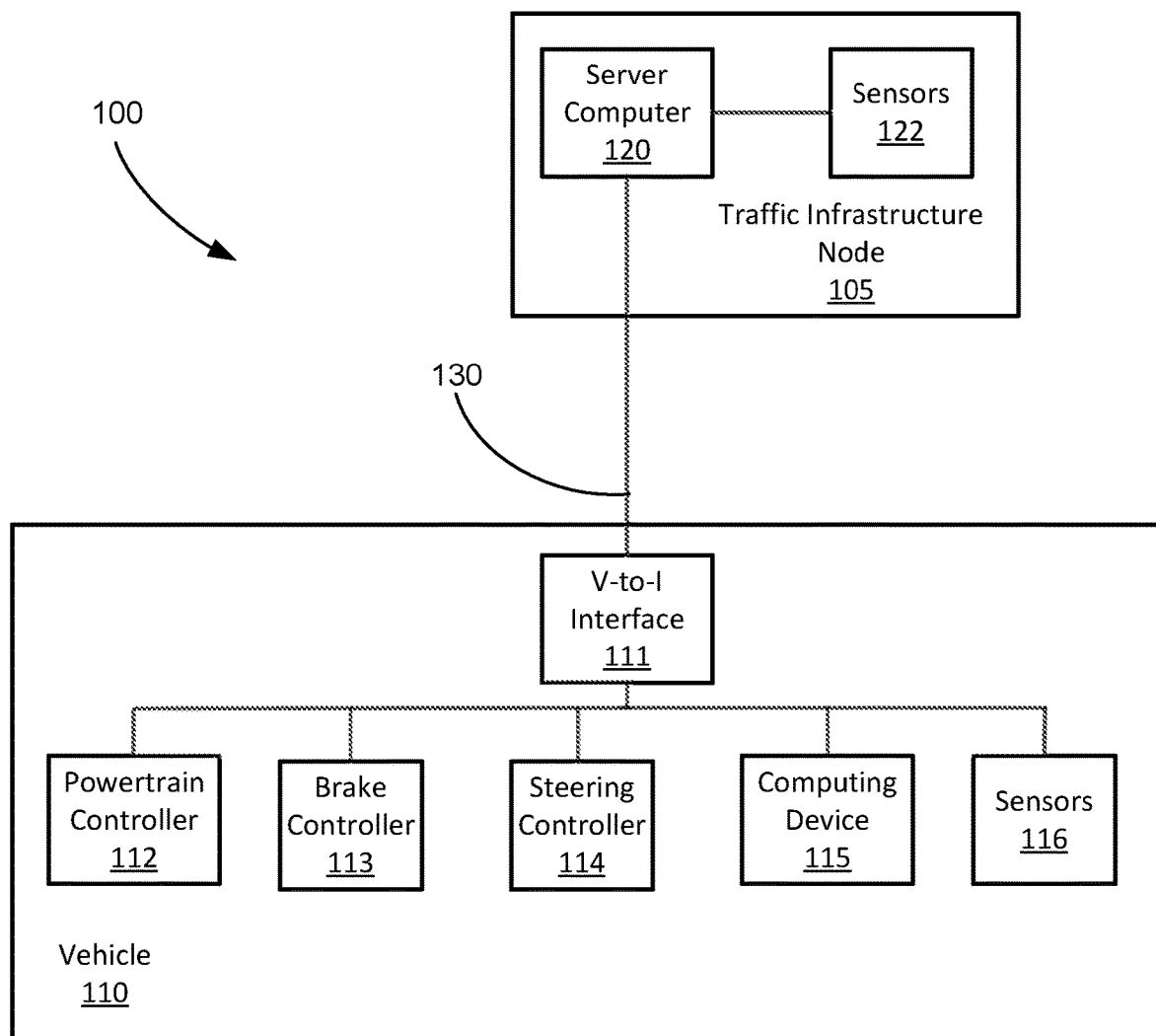
FIG. 1 is a block diagram of an example traffic infrastructure system.

A system as described herein can be used to locate objects in an environment around the system and operate the system based on the location of the objects. Typically, sensor data can be provided to a computer to locate an object and determine a system trajectory based on the location of the object. A trajectory is a set of locations that can be indicated as coordinates in a coordinate system that along with velocities, e.g., vectors indicating speeds and headings, at respective locations. A computer in a system can determine a trajectory for operating the system that locates the system or portions of the system with respect to the object. A vehicle is described herein as an example of a system that includes a sensor to acquire data regarding an object, a computer to process the sensor data and controllers to operate the vehicle based on output from the computer. Other systems that can include sensors, computers and controllers that can respond to objects in an environment around the system include robots, security systems and object tracking systems.

A non-limiting example of an object that can be located with respect to a vehicle is a wireless charging pad. A wireless charging pad is a device, typically installed on the floor of a building such as a garage, service facility or parking structure. A vehicle can be operated to position a wireless receiver in close proximity above, but not touching, the wireless charging pad. The wireless charging pad can then transfer power to charge a battery, for example, in the vehicle by inductively coupling the wireless charging pad to the wireless receiver. Inductive coupling is transferring electrical power by generating an oscillating electromagnetic field in a transmitting coil that induces an electrical current in a receiving coil without physical connection between the transmitting coil and the receiving coil.

Charging a vehicle battery with a wireless charging pad located on a floor can be accomplished by a computer in a vehicle acquiring image data that includes the wireless charging pad, determining the location of the wireless charging pad with respect to the vehicle, and operating the vehicle to position a wireless receiver included in the vehicle above and in close proximity (1 cm or less) to the wireless charging pad. Indoor locations such as garages, service facilities and parking structures can include low light conditions. Photometric stereo works best when the image data is acquired at an ambient light level below a specified threshold because photometric stereo depends upon causing a noticeable change in illumination using vehicle lighting. The threshold can be based on lux levels, where a lux is an illumination of one lumen per square meter. Low light conditions are defined as illumination of 400 lux or less, which is the light level indoors with typical indoor lights or outdoors on a dark, overcast day. Low light conditions can be challenging for machine vision techniques that rely on ambient illumination for locating and identifying objects. Locating and identifying objects using photometric stereo based on existing vehicle illumination as described herein can enhance wireless charging by locating and identifying a wireless charging pad in low light conditions without requiring additional lighting or range sensing equipment such as radar, ultrasound or lidar. Photometric stereo can provide better distance resolution and better angular resolution than either radar or ultrasound at close ranges as discussed herein.

Photometric stereo is a technique for determining object surface normals in image data based on illuminating an object with two or more different light sources. Object surface normal are vectors that indicate a direction perpendicular to the surface of an object. Object surface normals can be "integrated" to determine three-dimensional object shapes. Integration in this context means to expand each object surface normal to form a patch that indicates a portion of the object surface in the vicinity of the object surface normal and then combining the patches to form the object surface. Object surface normals are determined by illuminating the object with light from three or more sources that are spaced apart from a camera that acquires the image data. Images, or portions of images are acquired while illuminating the object from each light individually. The intensity of light reflected by the object from each light source is a function of the location of the light source with respect to the camera. An estimated object surface normal can be determined simultaneously solving for an object surface normal that would yield the various intensities for the various light sources. Further, a depth image may be produced via numerical integration under some constraint of the surface normal generated which may optionally may be fused from other sensor modalities.

A further non-limiting example of objects that can be located and identified with respect to a vehicle are parking objects. Parking objects include vehicles, curbs, and lane markers. Parking a vehicle can include determining locations and identities of one or more parking objects and operating the vehicle to position the vehicle with respect to the located parking objects. Again, Low light conditions can be challenging for machine vision techniques that rely on ambient illumination for locating and identifying objects.

Locating and identifying objects using photometric stereo based on existing vehicle illumination as described herein can enhance parking by locating and identifying parking objects in low light conditions without requiring additional lighting or range sensing equipment such as radar, ultrasound or lidar, permitting a vehicle to determine a vehicle trajectory upon which to operate.

A method is disclosed herein, including activating light sources in a pattern at an illumination frequency and acquiring image data depicting light reflected from an object at a timing indicating the pattern at the illumination frequency. In response to variations in the light reflected from the object based on the pattern, an object contour can be determined based on estimating an object surface normal determined by a photometric stereo technique; and one or more of an identity and a depth of the object can be determined based on combining the object contour with the image data. A spatial separation of the light sources can be based on a maximum depth of the object. The pattern can be determined by sequentially activating the light sources. The image data can be captured at a frame rate and the illumination frequency is greater than the frame rate.

The light sources can include a combination of taillights, reverse lights, turn indicators, headlights, fog lights, or auxiliary lights of a vehicle. Second image data can be acquired without activating the light sources to determine global illumination. A change in illumination of the object due to activation of the light sources can be based on the global illumination. One or more of the identity and the depth of the object can be based on combining the object contour with the image data and a structure determined from motion data. Confidence in the object contour can be determined based on determining changes in image data indicated by the pattern at the illumination frequency. The confidence can be used to determine whether the object contour is usable. Operating a vehicle can be based on one or more of the identity and the depth of the object. The vehicle can be operated at a speed at which a change in the depth of the object between updates is below a specified threshold. Operating the vehicle can include parking. Operating the vehicle can include locating a wireless charging pad.

Further disclosed is a computer readable medium, storing program instructions for executing some or all of the above method steps. Further disclosed is a computer programmed for executing some or all of the above method steps, including a computer apparatus, programmed to activatie light sources in a pattern at an illumination frequency and acquire image data depicting light reflected from an object at a timing indicating the pattern at the illumination frequency. In response to variations in the light reflected from the object based on the pattern, an object contour can be determined based on estimating an object surface normal determined by a photometric stereo technique; and one or more of an identity and a depth of the object can be determined based on combining the object contour with the image data. A spatial separation of the light sources can be based on a maximum depth of the object. The pattern can be determined by sequentially activating the light sources. The image data can be captured at a frame rate and the illumination frequency is greater than the frame rate.

The instructions can include further instructions wherein the light sources can include a combination of taillights, reverse lights, turn indicators, headlights, fog lights, or auxiliary lights of a vehicle. Second image data can be acquired without activating the light sources to determine global illumination. A change in illumination of the object due to activation of the light sources can be based on the global illumination. One or more of the identity and the depth of the object can be based on combining the object contour with the image data and a structure determined from motion data. Confidence in the object contour can be determined based on determining changes in image data indicated by the pattern at the illumination frequency. The confidence can be used to determine whether the object contour is usable. Operating a vehicle can be based on one or more of the identity and the depth of the object. The vehicle can be operated at a speed at which a change in the depth of the object between updates is below a specified threshold. Operating the vehicle can include parking. Operating the vehicle can include locating a wireless charging pad.

FIG. 1 is a diagram of a sensing system 100 that can include a traffic infrastructure node 105 that includes a server computer 120. Sensing system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in autonomous, semi-autonomous, or manual modes. By a semi- or fully-autonomous mode, we mean a mode of operation wherein a vehicle can be piloted partly or entirely by a computing device as part of a system having sensors and controllers. For purposes of this disclosure, an autonomous mode is defined as one in which each of vehicle propulsion (i.e., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer. In a semi-autonomous mode, some but not all of them are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120, can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary. That is, each sensor 122 is mounted to the infrastructure node so as to have a substantially unmoving and unchanging field of view.

Server computer 120 typically has features in common, i.e., a computer processor and memory and configuration for communication via a network 130, with the vehicle 110 V2X interface 111 and computing device 115, and therefore these features will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computing device 115 can receive sensor 116, 122 data to monitor one or more objects. An "object," in the context of this disclosure, is a physical, i.e., material, structure or thing that can be detected by a vehicle sensor 116 and/or infrastructure sensor 122.

Figure 2:
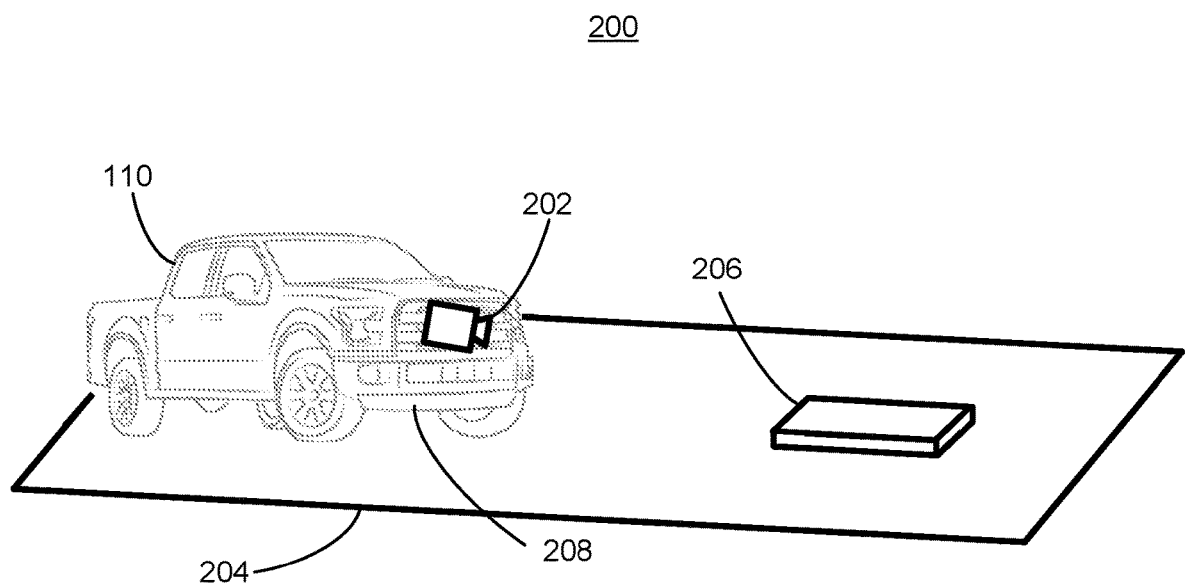
FIG. 2 is a diagram of an example vehicle including an object.

FIG. 2 is a diagram of a traffic scene 200. Traffic scene 200 includes a vehicle 110 as it operates on a surface 202 which can be, for example, a roadway, pavement, a parking lot, or a floor included in a garage, service facility, parking structure or other building. Vehicle 110 can include a camera 204, which can be a video camera. As discussed above in relation to FIG. 1, a vehicle 110 can include a sensor 116, in this example a camera 204 that can acquire data regarding an environment around the vehicle 110. Vehicle 110 can include variety of sensors 116 including one or more of a lidar sensor, a radar sensor, or an ultrasound sensor to acquire data regarding an environment around the vehicle 110. A computing device 115 in the vehicle 110 can receive as input data acquired by camera 204 and process the data to determine the location and identity of object 206, which can be a wireless charging pad. Vehicle 110 can include a wireless receiver 208 that is operative to inductively couple to wireless charging pad object 206 to charge a battery included in vehicle 110.

The location of the object 206 with respect to the vehicle 110 can be determined in a real world coordinate system. Real world coordinates include x, y, and z location coordinates and roll, pitch, and yaw rotational coordinates determined with respect to a global coordinate system such as latitude, longitude, and altitude. A computing device 115 in a vehicle 110 can acquire image data from a camera 204 and using photometric stereo based on existing vehicle illumination techniques described herein identify and locate a wireless charging pad object 206 with respect to the vehicle 110. Computing device 115 can determine a vehicle trajectory that would position a wireless receiver 208 included in the vehicle in close proximity to the wireless charging pad object 206 to permit the wireless receiver 208 and the wireless charging pad object 206 to become inductively coupled and charge a battery included in the vehicle 110.

A vehicle trajectory is a curve, typically a polynomial function that includes predicted locations and speeds for a vehicle 110 as it travels with respect to the surface 202. Based on the locations and speeds, lateral and longitudinal accelerations can be determined. Computing device 115 can determine commands to transmit to controllers 112, 113, 114 to control vehicle powertrain, vehicle steering, and vehicle brakes to achieve lateral and longitudinal accelerations to cause the vehicle 110 to travel along the path and stop at the determined location. Because photometric stereo based on existing vehicle illumination techniques works in low light conditions proximate to the vehicle (within 5 to 7 meters), the vehicle trajectory is limited to low speeds, e.g., less than 10 kilometers per hour, for example. A technique for determining low speed is determine the differences in a detected object's location as a vehicle moves. For a given update rate at which successive locations of an object are detected, if the difference in an object's location is less than a predetermined threshold, the vehicle is moving at an acceptably low speed. If the difference in successive locations of the object is greater than the threshold between updates, the vehicle is moving too fast and photometric stereo is not indicated for detecting objects.

In a further example, photometric stereo based on existing vehicle illumination techniques described herein can be used to assist a vehicle 110 in parking. Parking is operating a vehicle 110 to position the vehicle 110 in a parking spot. A parking spot is a location for temporary storage of a vehicle 110 and is typically not much larger than the space occupied by the vehicle 110 and can be in close proximity with other vehicles. Photometric stereo based on existing vehicle illumination can enhance vehicle parking by determining identities and locations of vehicles and objects such as curbs in low light conditions outdoors and indoors.

Figure 3:
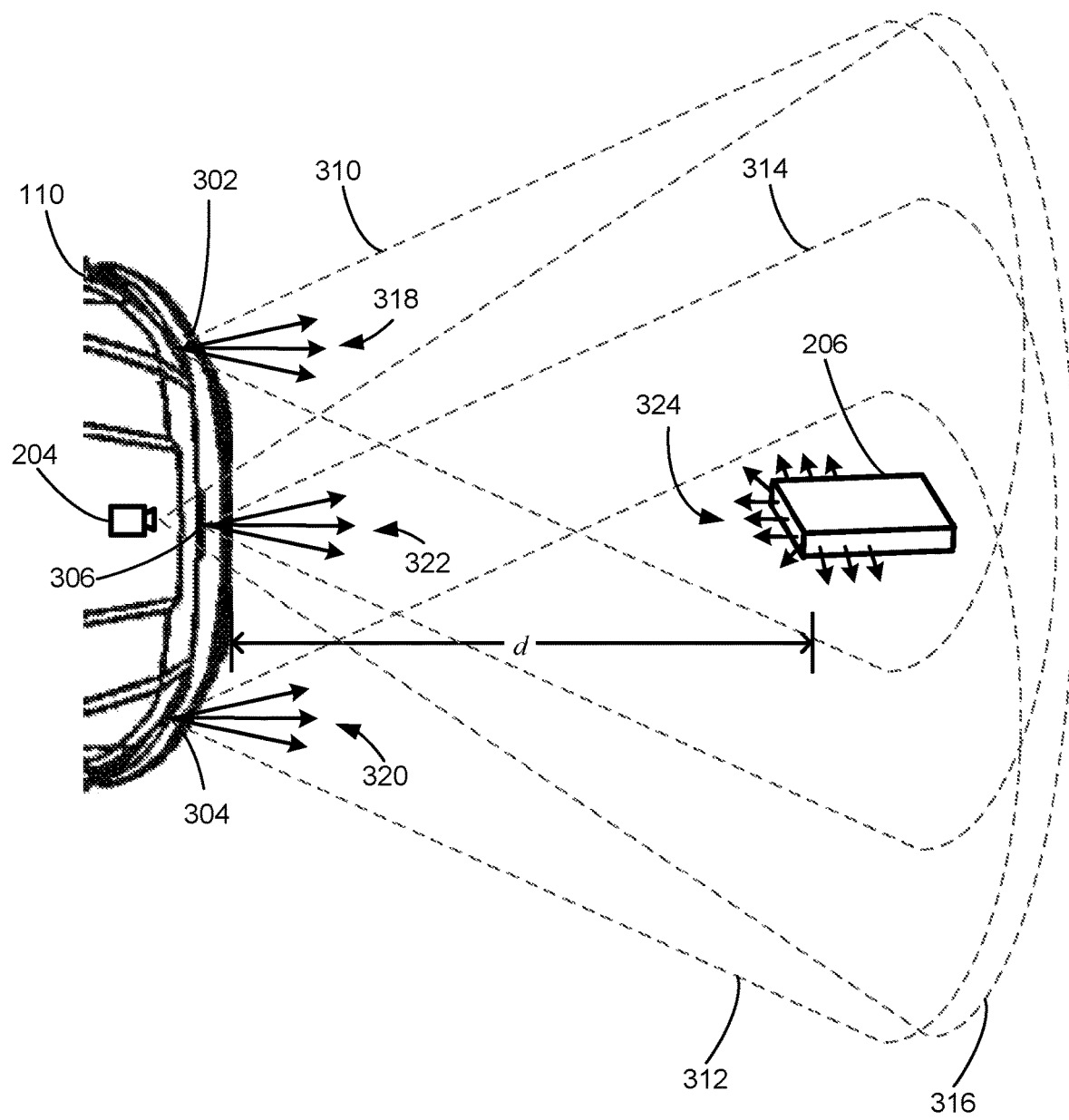
FIG. 3 is a diagram of an example object including surface normals.

Referring now to FIG. 3, a technique for identifying and locating an object 206 proximate to a vehicle 110 is discussed. As previously discussed, the computing device 115 may be configured to detect an object 206 by photometric stereo. In this context detect and object 206 means to identify and locate the object 206. Other techniques for object detection may be used by the vehicle 110 depending on the distance of the objects, the local lighting, and other environmental conditions. In examples where environmental illumination is greater than low light levels and high resolution is not required, a camera included in a vehicle 110 can acquire a color red, green, blue (RGB) image and process the RGB image with a trained neural network executing on a computing device 115 included in the vehicle. In examples where high spatial resolution is not required, a radar sensor or laser sensor can provide object 206 detection. High spatial resolution means less than 10 cm resolution in x, y and z real world coordinates. With reference to the object 206, a vehicle 110 may implement a first sensory detection apparatus or technique to detect the object 206 within a first distance range at a first resolution. Once the estimated distance from the vehicle 110 to the object 206 is less than a user determined distance threshold, the computing device 115 may utilize photometric stereo based on existing vehicle illumination techniques described herein to identify and locate the object 206 within a second distance range at a second resolution. Photometric stereo can include determining ambient illumination to predict the amount of flicker caused by the vehicle illumination, the effects of motion by the vehicle illumination, and the effects of potential additional illumination A first detection technique may implement one or more of the sensors 116 of the vehicle 110 to determine a first distance to the object 206. Sensors 116 can include a radar or laser sensor to detect the object 206 at the first distance range, e.g., a distance greater than 5 m. The first detection technique of the vehicle 110 may implement one or more location sensors 116 including a GPS or inertial measurement unit (IMU) to determine a location of the vehicle 110 in real world coordinates. An IMU determines vehicle 110 location based on accelerometers. The vehicle coordinates can be applied to a map that can be downloaded to the computing device 115 via network 130. The map can include the location of the object 206 which can be compared to the vehicle coordinates to determine a first distance to the object.

The computing device 115 can measure the ambient light level to determine if the global illumination around the vehicle includes a low light level. The computing device 115 can acquire data regarding the environmental light level using a photometric sensor that measures illumination in a scene around the vehicle 110. The computing device 115 can acquire an image from a camera 204 with without activating vehicle light sources to measure the average pixel values to determine global illumination. In examples, a computing device 115 can download data via network 130 to determine a time of day, the position of the sun, and current cloud cover to estimate global illumination. The computing device 115 can use mapping data or image data to determine that the vehicle 110 is currently inside a building or parking structure. Photometric stereo techniques can determine a change in illumination of the object due to activation of the plurality of light sources based on the global illumination.

When the computing device 115 has determined that an object 206 is within 5-7 m of an object 206, a low light global illumination level exists in the environment and vehicle 110 is moving a low speed, computing device can detect the object 206 using photometric stereo. Photometric stereo may implement one or more cameras 204 in combination with left headlight 302, right headlight 304 and auxiliary light 306 (collectively light sources 302, 304, 306) to detect the object 206 by activating the light sources in a pattern at an illumination frequency. Implementation of photometric stereo is assisted by current vehicle designs, which can use additional illumination sources as design elements. Illumination frequency is the time at which the light sources 302, 304, 306 are individually energized to illuminate an object in a scene. For example, with three light sources 302, 304, 306, each light source 302, 304, 306 can be energized for one video frame yielding an illumination frequency of three frames. Acquisition of the three frames of image data by a camera 204 can be synchronized to the energizing of the light sources 302, 304, 306 so that the three images will include the variation in light reflected by an object in the scene from each light source 302, 304, 306 in turn.

Photometric stereo can also use data regarding the illumination pattern emitted by individual light sources 302, 304, 206. Individual light sources 302, 304, 306 are not always best modeled as point light sources. Calculations included in photometric stereo can be configured to models non-point light sources by modeling the light source 302, 304, 306 using a polar plot that indicates the direction and strength of the illumination from a light source over the field of illumination 310, 312, 314 of non-point light sources. Photometric stereo techniques as discussed herein can detect and compensate for occlusion or shadowing of illumination sources 302, 304, 306 by determining image pixels that do not change with changing illumination. Other examples of photometric stereo use different colors of light sources 302, 304, 306 that can be acquired at the same time using a color camera and filtered by color to separate the illumination from each light source 302, 304, 306. Color photometric stereo can require analyzing the scene with no vehicle illumination to determine colors present in the scene which can then be compensated for when filtering an acquired image by color.

Variations in light reflected by an object in the scene are caused by differences in directions between illumination directions, illustrated by vectors 318, 320, 322 of the fields of illumination 310, 312, 314 of the light sources 302, 304, 306. Differences in illumination directions between light sources 302, 304, 306 will cause differences in light intensities indicated by pixel values on the surface of an object 206 based on the direction from which each of the light sources 302, 304, 306 illuminate the object 206. Photometric stereo is a technique for measuring the variations in pixel values at points on the surface of an object 206, and, based on the 3D locations of the light sources 302, 304, 306, determining an orientation of the surface of an object 206 expressed as an object surface normal and a distance of the surface of the object 206 from the light sources 302, 304, 206.

In response to the variations in the light reflected from the object based on the pattern of illumination, photometric stereo technique can estimate one or more object surface normals that indicate the location and orientation of the surface of object with respect to the camera 204. Object surface normals can be combined to determine an object contour by combining adjacent object surface normals. An object contour is a line in three-dimensional (3D) space determined by vectors that indicate the surface of an object. Photometric stereo may be activated when the object distance is within a user determined distance, low light levels exist, and the vehicle 110 is moving a low speed.

In examples of photometric stereo techniques that employ a camera 204 that acquire data with a rolling shutter technique, the illumination frequency can be less than a full frame time per light source 302, 304, 306. In rolling shutter acquisition, individual lines of image data start and stop integrating light in sequence during a video frame time, for example from top to bottom of a frame of video data. Energizing the light sources 302, 304, 306 can be synchronized with the rolling shutter to permit subsets of lines of image data to indicate variations in illumination from multiple light sources 302, 304, 306 in one or more video frame times, where the illumination frequency can be less than a full frame time per light source 302, 304, 306.

The user determined distance for applying the second detection technique may be limited because photometric stereo based on existing vehicle illumination may require the light impinging upon the object 206 to be readily detected by the camera 204, e.g., the light reflected from the object 206 results in measurable pixel values. Additionally or alternatively, the operating range of the second technique may be limited because the spatial separation of the light sources 302, 304, 306 may be insufficient to directionally illuminate the object 206 over long distances. Engergizing light sources 302, 304, 306 at high intensity can provide high dynamic range illumination that permits photometric stereo to operate at greater distance. The spatial separation of the light sources must be such that illumination from the light sources 302, 304, 306 generate measurably different pixel values when the light sources are switched. The user determined distance may be dependent on the separation of the light sources 302, 304, 306, the intensity of the light sources 302, 304, 306, global illumination levels, and the sensitivity of the camera 204. Camera 204 sensitivity is measured by the smallest change in illumination that results in a least a one bit change in pixel values. For example, spatial separation of the light sources can be based on a maximum depth of the object. Accordingly, the user determined distance may be identified for a specific vehicle 110 based on measured camera 204 performance and dimensional characteristics of the light sources 302, 304, 306 for a given global light level.

As illustrated in FIG. 3, once the vehicle 110 has approached an object 206 within the distance d, the computing device 115 may implement a photometric stereo technique that can accurately identify the object 206 and determine its distance d from the vehicle 110. The depth at which an object can be detected can depend upon the spatial separation of the light sources 302, 304, 306, the intensity of the light sources 302, 304, 306, the global or background illumination of the scene, and the sensitivity of the camera 204. As illustrated in FIG. 3, the photometric stereo detection technique may implement one or more of the light sources of the vehicle to illuminate the object 206 with varying pattern of light. In the example depicted in FIG. 3, the light sources 302, 304, 306 can also include taillights, reverse lights, turn indicators, headlights, fog lights, and various segments of auxiliary lights, each of which are directed outwards from the vehicle 110 and illuminate the fields of illumination 310, 312, 314 included in the field of view 316 of a camera 204. In this configuration, the computing device 115 may sequentially activate a plurality of the light sources, which may be spatially separated over a lateral distance perpendicular to the forward field of view. For example, the object 206 may be illuminated by a field of illumination 310 output from the left headlight 302, a field of illumination 312 output from the right headlight 304, and a field of illumination 314 output from auxiliary light 306, respectively. In this way, the object 206 may be illuminated by light sources 302, 304, 306 extending over a width of the vehicle 110 in a pattern and timing that activates each of a first field of illumination 310, a second field of illumination 312, and a third field of illumination 314 during non-overlapping time intervals.

By illuminating the object 206 with the different fields of illumination 310, 312, 314 at different time intervals, the surfaces and reflected light associated with emitted fields of illumination 310, 312, 314 can reveal different contours or surface features in the image data. By aligning the timing of the camera 204 data acquisition with energizing left and right headlights 302, 304 and auxiliary light 306 (i.e., acquiring data while the headlights 302, 304 and auxiliary light 306 are illuminated), the scene in the camera field of view 316 may be distinctly illuminated emphasizing the surface features that are normal to the illumination vectors 318, 320, 322 of the fields of illumination 310, 312, 314, respectively. As shown, the vectors 318, 320, 322 of the fields of illumination 310, 312, 314 are depicted as arrows. In this way, a frequency of the illumination may be temporally aligned with the image data by energizing each light source 302, 304, 306 in separate exposure intervals to acquire illumination patterns indicated by the fields of illumination 310, 312 314 in separate images. Based on the image data captured from this process, the computing device 115 may identify the object 206 and determine the distance d to the object based on determining an object contour using a photometric stereo. Though discussed in reference to a forward-looking camera 204, it shall be understood that a rear camera or other cameras of the vehicle 110 in conjunction with other lights included in the vehicle 110 may similarly be implemented to identify and determine a depth of objects and terrain proximate to the vehicle 110 in other directions with respect to the vehicle 110. Objests and terrain proximate to a vehicle can be determined by photometric stereo techniques as discussed herein combined with multi-view stereo, radar fusion which combines photometric stereo with radar data. These techniques can determine surface normals by constraining photometric stereo using additional data from other distance measusrments such as multi-view stereo or radar.

As depicted in FIG. 3, a first field of illumination 310 may be emitted from the left headlight 302 on a first side portion of the vehicle 110, a second field of illumination 312 may be emitted from the right headlight 304 of the vehicle 110 and a third field of illumination 314 emitted from an auxiliary light 306. The auxiliary light 306 may be a light bar (i.e., an arrangement with a row of lights) that may be configured to independently illuminate one or more lights extending along a width of the vehicle 110 between the left and right headlights 302, 304. In this configuration, the computing device 115 may activate one or more lights of the auxiliary light 306 to project light emissions from various locations extending across the width and height of the vehicle 110. In this way, the computing device 115 may illuminate a target (e.g., the object 206) from various intermediate locations positioned between the headlights 302, 304 of the vehicle 110. Accordingly, though the fields of illumination 310, 312, 314 are discussed in reference to specific light sources, the computing device 115 may activate additional light sources of the vehicle 110 to illuminate the object 206.

In general, the illumination of the object 206 in the field of view 316 of the camera 204 may be illuminated sequentially at a frequency approximately commensurate to a duration of an exposure time for an image of the camera 204 at a frame rate. In some cases, the illumination frequency may even exceed the frame rate, such that the image data depicting each of the fields of illumination 310, 312, 314 are depicted in the image data over multiple frames. For example, a frame rate may be approximately 60 frames per second (FPS) and the illumination frequency may be approximately 10 Hz. As discussed later, in some cases, light sources be incorporated on the vehicle 110 configured to emit light at near infrared wavelengths (e.g., 680 nm to 2500 nm) or infrared wavelengths (e.g., 700 nm to 1 mm). In general, visible light, as discussed herein, may correspond to wavelengths ranging from approximately 400 nm to 700 nm. In such implementations, the light captured by the camera 204 may be filtered to emphasize the wavelengths of light output from the light sources.

A technique for estimating object surface normals by photometric stereo based on existing vehicle illumination is described in "Near-Field Photometric Stereo in Ambient Light" by Fotios Logothetis et. al., available at bmva.org/bmvc/2016/paper061/paper061.pdf as of the filing date of this application. This technique describes photometric stereo based on multiple illumination sources as a solution to partial differential equations (PDEs). Photometric stereo based on existing vehicle illumination can also be solved by training a deep neural network to input a plurality of images acquired by a camera 204 while illuminating the scene with multiple illumination sources and output object surface normals indicating objects 206 included in the scene. The deep neural network can be trained by acquiring a plurality of sets of images acquired by a camera 204 while illuminating the scene with multiple illumination sources along with ground truth data acquired by physically measuring object surface normals 324 for an object 206 included in the scene. Object surface normals 324 and a distance d for an object 206 included in a scene can be estimated by processing acquired image data either using PDE techniques or deep neural networks.

Estimating object surface normals 324 can be enhanced by acquiring an ambient illumination image by acquiring an image using camera 204 while turning off all light sources included in the vehicle 110. The ambient illumination image can be subtracted from the images acquired with vehicle illumination sources to generate difference images with ambient illumination suppressed. An image can be acquired with all vehicle illumination sources turned on to acquire a fully illuminated image. The fully illuminated image can be processed with image processing software or a trained deep neural network to identify objects 206. A fully illuminated image can be combined with object contour data to identify and locate objects. Examples of image processing software libraries that can be used to identify objects 206 include OpenCV, available at OpenCV.org as of the filing date of this application, and MatLab, available from MathWorks.com as of the filing date of this application. A deep neural network can be trained based on a plurality of images that include objects 206 and ground truth that includes data regarding the identity and location of the object 206.

Figure 4:
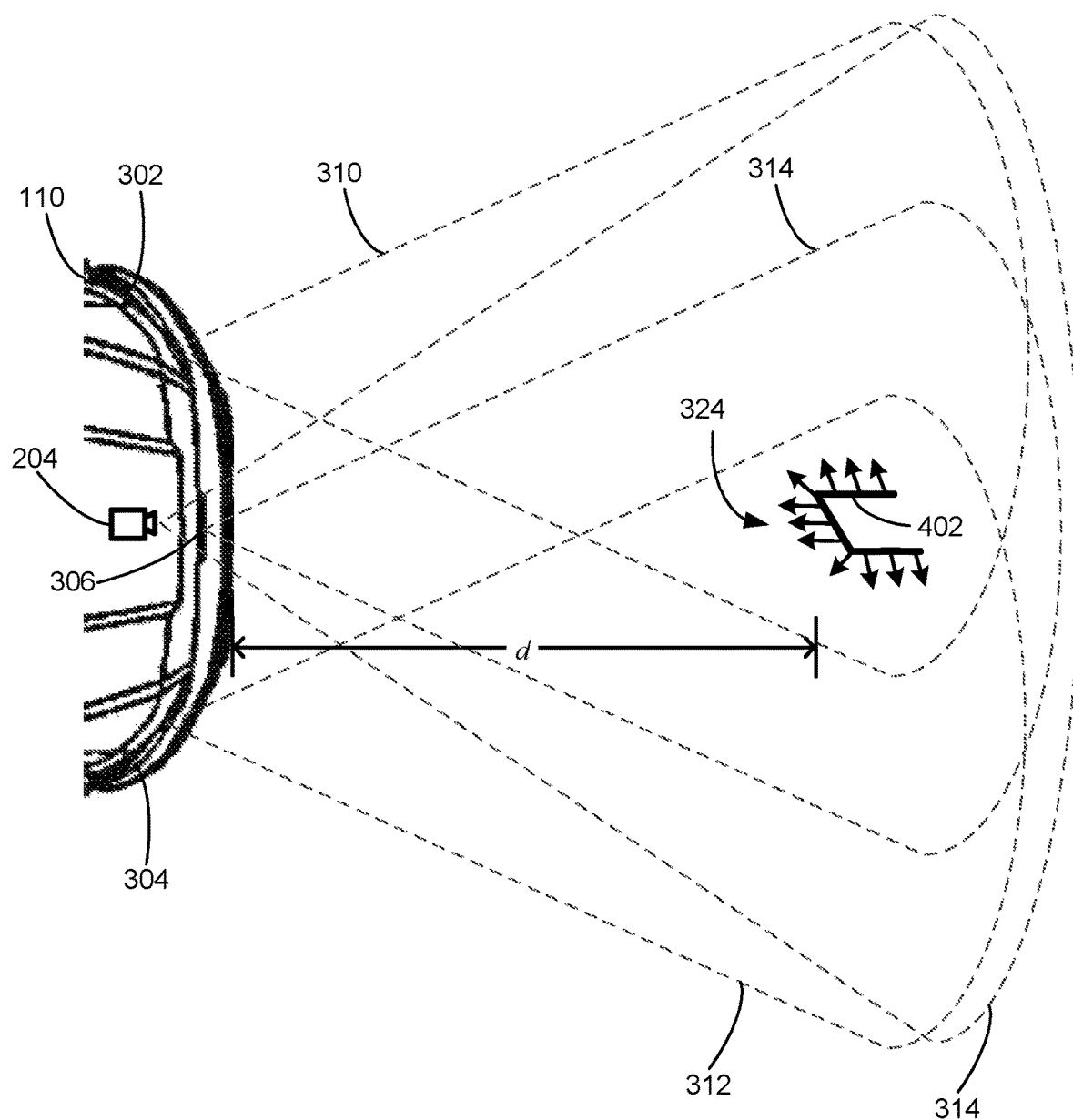
FIG. 4 is a diagram of an example surface normals and an object contour.

FIG. 4 is a diagram illustrating a contour 402 determined based on estimated object surface normals 324. Contour 402 can be determined by integrating object surface normals 324. As discussed above, "patches" or small regions indicating the surface of object 206 at the locations of object surface normals 324 can be combined to form a contour 402 that indicates the location of the surface of object 206 along a line. Multiple contours 402 indicating the surface of object 206 at different levels with respect to camera 204 can be determined and combined to indicate the surface of object 206. One or more contours 402 can be compared to a library of previously determined contours 402 to identify an object 206. The contours can be translated, rotated and scaled in six degrees of freedom to identify an object 206 when viewed from a distance and direction different from the library view. The acquired contour 402 can be compared to the stored contour using image processing techniques including template matching and normalized correlation. The acquired contour can also be combined with an intensity image and processed using a neural network such as a convolutional nearal network. The three degree of freedom surface normal data and a confidence value can be combined with a color image in an input stack. In other examples the raw illumination data can be combined with image data and input to a trained neural network to determine object surface normals 324 and confidence values in a single pass.

Figure 5:
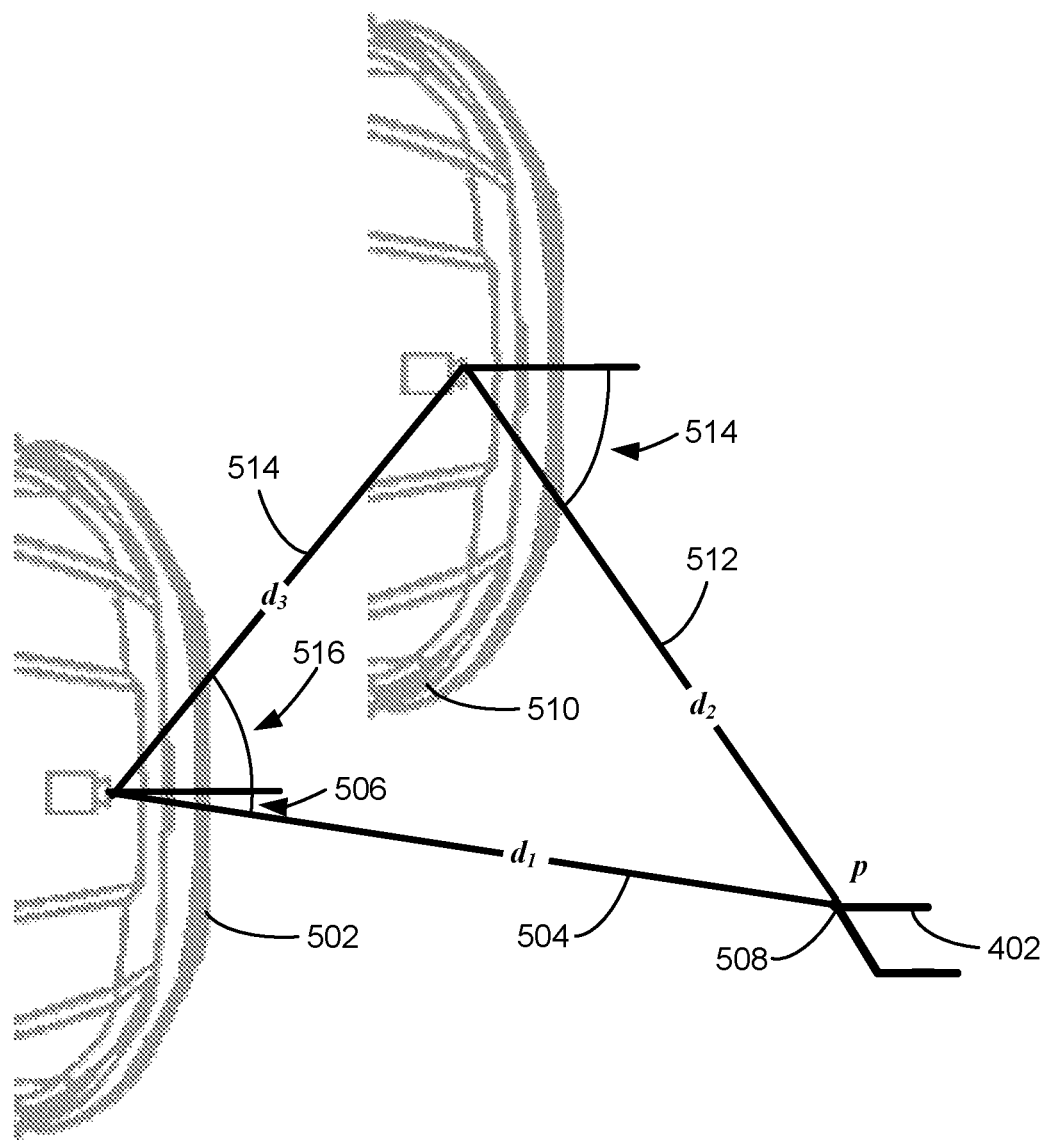
FIG. 5 is a diagram of motion assisted determination of surface normals and depth.

FIG. 5 is a diagram illustrating locating an object 206 using structure from motion techniques. Structure from motion is a technique for using two or estimates of location for an object 206 based on two or more locations of a vehicle 110. Photometric stereo can be combined with structure from motion to determine the object identity and the object depth based on combining the object contour with image data and a structure determined from motion data. In FIG. 5, a computing device 115 in a vehicle 110 at a first location 502 can determine a first distance $d_1$ 504 at a first angle 506 from a location on the vehicle 110 to a point p 508 on a contour 402. The first distance $d_1$ 504 at a first angle 506 to a point p 508 from vehicle 110 at the first location 502 can be determined using photometric stereo as discussed above in relation to FIGS. 3 and 4. At a second time vehicle 110 can move to a second location 510. Sensors 116 included in vehicle 110, for example an IMU in addition to wheel rotation data and other data regarding vehicle motion, can determine the distance $d_3$ 514 and angle 516 between first location 502 and second location 510 based on a vehicle physics model and data regarding the location and orientation of the camera with respect to a ground plane, e.g., the roadway. Using photometric stereo, computing device 115 can determine a second distance $d_2$ 512 and second angle 514 from a location on the vehicle 110 to the point p 508 Using the distance $d_3$ 514 and angle 516 between first location 502 and the second location 510, two estimates of the location of the point p in real world coordinates can be determined. The two estimates can be combined, for example by averaging to determine an enhanced estimate for the location of point p and the object 206. Multiple estimates for the location of point p based on multiple locations of the vehicle can be combined in this fashion to provide and enhanced estimate of the location of object 206.

A further enhancement to determining object contour 402 by photometric stereo can be determining which pixels in an image change when the illumination source changes. Portions of the image that do not change when the illumination is changed by energizing one or more of the light sources 302, 304, 306 can be marked as being in shadow or beyond the range of the light sources 302, 304, 306. Portions of the image marked as being in shadow or beyond the range of the light sources 302, 304, 306 can be withheld from processing to increase the processing speed of the photometric stereo system. This can also be used to account for changes in global illumination as the vehicle 110 moves in interior spaces where the vehicle 110 can occlude overhead lighting and create shadows, for example. Re-acquiring images without energizing light sources 302, 304, 306 can determine global illumination to detect new portions in the field of view 316 of the camera 204 that are subject to shadows. The global illumination image can be used to detect portions of the image that do not change when illuminated by light sources 302, 304, 306 and can be marked as not be processed. Determining the amount of pixel value change in portions of the image that change with respect to changes in illumination indicate the confidence that alternating patterns of illumination provide data for photometric stereo. The greater the change in pixel values, the greater the confidence in the accuracy of the object surface normals 324 and the greater the confidence in the determined object contour 402. The greater the confidence, the more likely that the object contour 402 is usable for object identification and location. In addition, the change in pixel intensity can provide data regarding distance based on assumptions regarding object reflectivity and surface normal directions.

Figure 6:
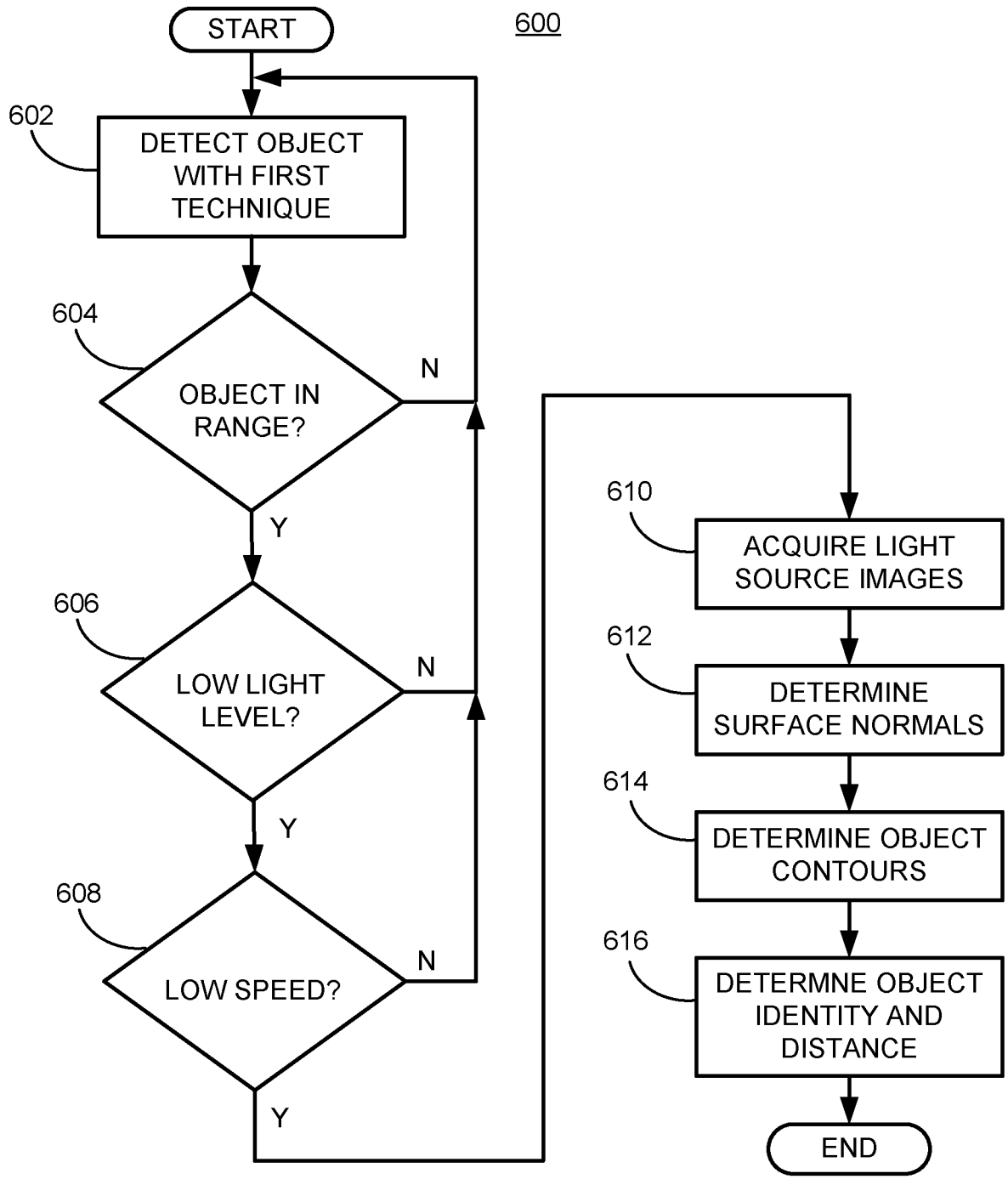
FIG. 6 is a flowchart diagram of an example process to detect an object by photometric stereo.

FIG. 6 is a flowchart, described in relation to FIGS. 1-5 of a process 600 for detecting objects by photometric stereo. Process 600 can be implemented by a processor of a computing device 115, taking as input images acquired from a camera 204, executing commands, and outputting an object identity and location. Process 600 includes multiple blocks that can be executed in the illustrated order. Process 600 could alternatively or additionally include fewer blocks or can include the blocks executed in different orders.

Process 600 begins at block 602, where computing device 115 detects an object 206 with a first technique. The first technique can be one or more of 1) acquiring an image and processing the image with computing device 115 to identify and locate the object 206 by one or more of image processing techniques or a neural network, 2) acquiring range data from a radar sensor or lidar sensor and processing the radar or lidar data with computing device 115, and 3) determining a vehicle 110 location using one or more of GPS and IMU sensors and locating an object 206 in map data.

At block 604 the computing device 115 determines whether the object 206 is within range to permit photometric stereo to detect the object with greater accuracy than the first techniques discussed at block 602. If the object 206 is not within range, process 600 passes to block 602 to detect the object 206 again using one or more first techniques. If the object 206 is within range, process 600 passes to block 606.

At block 606 computing device 115 determines whether the light level in the environment around the vehicle indicated by lux input to a sensor is low enough to permit photometric stereo to detect objects. A low light level indicates that the vehicle 110 is indoors, in shadow, the time of day is between dusk and dawn, or the lighting in the environment is a dark, overcast day. If the light level is not low, process 600 passes back to block 602 to detect the object 206 again using one or more first techniques. If the light level is low, process 600 passes to block 608.

At block 608 computing device 115 determines whether the vehicle 110 is moving at low speed. Vehicles move at low speed when parking or maneuvering to connect to a wireless charging pad, for example. If vehicle 110 is not moving at low speed, process 600 passes back to block 602 to detect the object 206 again using one or more first techniques. If vehicle 110 speed is low, process 600 passes to block 610.

At block 610 computing device 115 has determined that the object 206 is within range, the environment around the vehicle 110 includes low light levels, and the vehicle 110 is traveling at low speeds. Computing device 115 energizes light sources 302, 304, 306, one at a time while acquiring image data with a camera 204 to generate images or portions of images where an object 206 is illuminated by a single light source 302, 304, 306.

At block 612 computing device 115 processes the images acquired at block 610 to determine object surface normals 324 for points on the object 206. Object surface normals 324 are determined by photometric stereo techniques as discussed above in relation to FIGS. 3 and 4.

At block 614 computing device 115 determines an object contour 402 by integrating object surface normals 324 along a line on a surface of object 206 as discussed above in relation to FIG. 4.

At block 616 computing device 115 determines an identity and distance for an object 206. Object identity can be determined by matching the contour 402 to a library of previously determined contours 402 or by inputting the contour 402 to a trained neural network. Object distance can be output directly from a photometric stereo process as described above in relation FIGS. 4 and 5. Object distance can be enhanced by performing object from motion calculations based on determining changes in position of the camera 204 between images used to determine locations of object points by photometric stereo as discussed in relation to FIG. 5. Object identity and location can be output to other processes by computing device 115. Photometric stereo can provide object surface normals 324 that can be used to determine 3D bounding boxes to enhance determination of vehicle orientation in addition to depth alone. Determining vehicle orientation and depth can enhance determination of predicted vehicle trajectories. Following block 616 process 600 ends.

Figure 7:
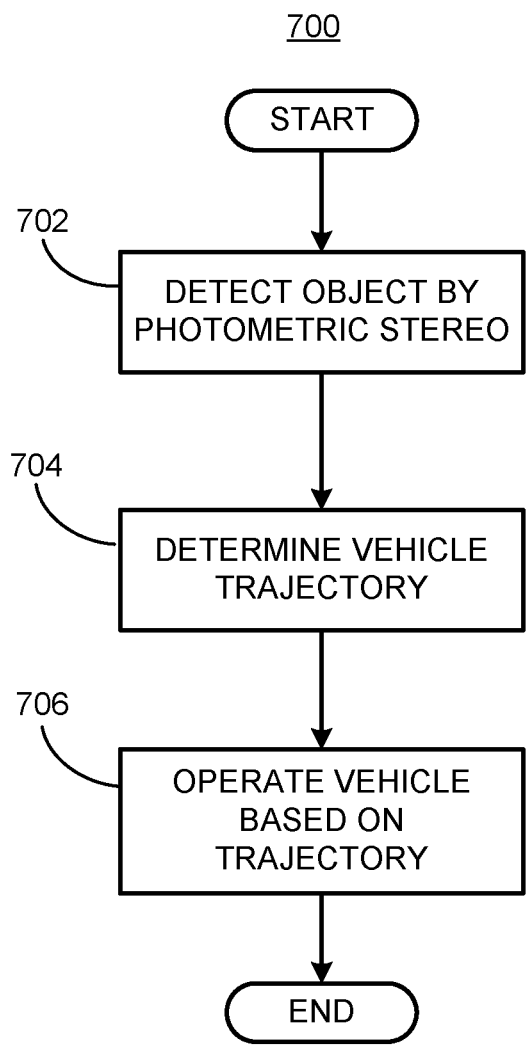
FIG. 7 is a flowchart diagram of an example process to operate a vehicle based on photometric stereo.

FIG. 7 is a flowchart, described in relation to FIGS. 1-6 of a process 700 for operating a vehicle 110 based on detecting an object 206 as described in relation to FIG. 6. Process 700 can be implemented by a processor of a computing device 115, taking as input image data that includes an object, executing commands, and operating a vehicle 110. Process 700 includes multiple blocks that can be executed in the illustrated order. Process 700 could alternatively or additionally include fewer blocks or can include the blocks executed in different orders.

At block 702 a computing device 115 detects and object 206 using photometric stereo as described above in relation to FIGS. 1-6. Detecting an object 206, in this context, means determining an identity and location for an object 206 in the field of view of a camera 204 included in a vehicle 110. As discussed above in relation to FIGS. 2-6, the object 206 is in range, low light levels exist in an environment around the vehicle 110, and the vehicle 110 is moving at low speed.

At block 704 the computing device 115 determines a trajectory for operating a vehicle 110 based on the object 206 detected at block 702. For example, the detected object 206 can be a wireless charging pad and the trajectory can be determined to position the wireless receiver on the vehicle 110 in proximity to the wireless charging pad to permit the wireless charging pad to charge a battery included in the vehicle 110. In another example, the detected object 206 can be a curb included in a parking spot and the trajectory can be determined to position the vehicle near the curb.

At block 706 computing device 115 operates the vehicle 110 based on the determined trajectory. Operating a vehicle 110 can include communicating commands from computing device 115 to controllers 112, 113, 114 to control one or more of vehicle powertrain, steering, and brakes to operate the vehicle 110 to cause the vehicle 110 to move to the determined position. The vehicle trajectory can be analyzed by computing device 115 to determine lateral and longitudinal accelerations to apply to the vehicle to cause the vehicle 110 to travel along the trajectory at the desired speeds. Following block 706 process 700 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
   a computer that includes a processor and a memory, the memory including instructions executable by the processor to:
   activate light sources in a pattern at an illumination frequency;
   acquire image data depicting light reflected from an object at a timing indicating the pattern at the illumination frequency;
   acquire second image data without activating the light sources to determine global illumination;
   in response to variations in the light reflected from the object based on the pattern, determine an object contour based on estimating an object surface normal determined by a photometric stereo technique; and
   determine one or more of an identity and a depth of the object based on combining the object contour with the image data.

2. The system of claim 1, wherein a spatial separation of the light sources is based on a maximum depth of the object.

3. The system of claim 2, wherein the pattern is determined by sequentially activating the light sources.

4. The system of claim 1, wherein the image data is captured at a frame rate and the illumination frequency is greater than the frame rate.

5. The system of claim 1, wherein the light sources include a combination of taillights, reverse lights, turn indicators, headlights, fog lights, or auxiliary lights of a vehicle.

6. The system of claim 1, wherein the instructions include further instructions to determine a change in illumination of the object due to activation of the light sources based on global illumination.

7. The system of claim 1, wherein the instructions include further instructions to determine one or more of the identity and the depth of the object based on combining the object contour with the image data and a structure determined from motion data.

8. The system of claim 1, wherein confidence in the object contour is determined based on determining changes in image data indicated by the pattern at the illumination frequency.

9. The system of claim 8, wherein the confidence is used to determine whether the object contour is usable.

10. The system of claim 1, wherein the instructions include further instructions to operate a vehicle based on one or more of the identity and the depth of the object.

11. The system of claim 10, wherein the vehicle is operated at a speed at which a change in the depth of the object between updates is below a specified threshold.

12. The system of claim 10, wherein operating the vehicle includes parking.

13. The system of claim 10, wherein operating the vehicle includes locating a wireless charging pad.

14. The system of claim 1, wherein the image data is acquired at a light level below a specified threshold.

15. The system of claim 14, wherein the specified threshold is based on a lux level less than the lux level included in a dark, overcast day and/or indoors.

16. A method, comprising:
    activating light sources in a pattern at an illumination frequency;
    acquiring image data depicting light reflected from an object at a timing indicating the pattern at the illumination frequency;
    acquire second image data without activating the light sources to determine global illumination;
    in response to variations in the light reflected from the object based on the pattern, determining an object contour based on estimating an object surface normal determined by a photometric stereo technique; and
    determining one or more of an identity and a depth of the object based on combining the object contour with the image data.

17. The method of claim 16, wherein a spatial separation of the light sources is based on a maximum depth of the object.

18. The method of claim 17, wherein the pattern is determined by sequentially activating the light sources.

19. The method of claim 16, wherein the image data is captured at a frame rate and the illumination frequency is greater than the frame rate.

20. The method of claim 16, wherein the light sources include a combination of taillights, reverse lights, turn indicators, headlights, fog lights, or auxiliary lights of a vehicle.

* * * * *